(12) United States Patent
Kaminski et al.

(10) Patent No.: US 11,466,756 B2
(45) Date of Patent: Oct. 11, 2022

(54) SYSTEM FOR A BELT TENSIONER

(71) Applicant: Ford Global Technologies, LLC, Dearborn, MI (US)

(72) Inventors: Allan Kaminski, Basildon (GB); Kevin Maile, Southend-on-Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 16/923,575

(22) Filed: Jul. 8, 2020

(65) Prior Publication Data

US 2021/0010571 A1    Jan. 14, 2021

(30) Foreign Application Priority Data

Jul. 10, 2019 (GB) ...................................... 1909870

(51) Int. Cl.
*F16H 7/12* (2006.01)
*F16H 7/08* (2006.01)
*F15B 15/12* (2006.01)

(52) U.S. Cl.
CPC ............ *F16H 7/129* (2013.01); *F15B 15/12* (2013.01); *F16H 7/0848* (2013.01); *F16H 7/12* (2013.01); *F16H 7/1236* (2013.01); *F16H 2007/0806* (2013.01); *F16H 2007/0812* (2013.01); *F16H 2007/0859* (2013.01); *F16H 2007/0865* (2013.01); *F16H 2007/0893* (2013.01)

(58) Field of Classification Search
CPC ........ F16H 7/02; F16H 7/08; F16H 2007/084; F16H 2007/0802; F16H 2007/0808; F16H 2007/0812; F16H 2007/0848; F16H 2007/0859; F16H 2007/0863; F16H 2007/0865; F16H 2007/0893; F16H 7/12; F16H 7/14; F16H 7/16; F16H 7/1254; F16H 7/1281; F16H 7/129; F16H 7/1227; F16H 7/1236; F16H 2007/0829; F16H 2007/0834; F16H 2007/0836; F16H 55/36; F16H 2055/366; F16H 2007/0806; F02B 67/06

See application file for complete search history.

(56) References Cited

U.S. PATENT DOCUMENTS 2,051,488 A * 8/1936 Dreyer .................... F16H 7/129
474/135
2,337,591 A * 12/1943 Coulson ................ F16H 7/1218
474/112

(Continued)

FOREIGN PATENT DOCUMENTS

DE    102016213274 A1    1/2018
GB         2022776 A  * 12/1979 ............. F02D 1/183

OTHER PUBLICATIONS

Great Britain Intellectual Property Office, Combined Search and Examination Report under Sections 17 and 18(3) Issued in Application No. GB1909870.6, dated Nov. 21, 2019, 6 pages.

*Primary Examiner* — Michael R Mansen
*Assistant Examiner* — Raveen J Dias
(74) *Attorney, Agent, or Firm* — Vincent Mastrogiacomo; McCoy Russell LLP

(57) ABSTRACT

Systems are provided for a belt tensioner. In one example, the belt tensioner comprises a fluid chamber divided into a first portion and a second portion via a dividing wall. An eccentric housing, which defines the fluid chamber, rotates relative to the dividing wall based on a spring force and a belt force.

19 Claims, 3 Drawing Sheets

(56) References Cited

U.S. PATENT DOCUMENTS

| | | | | | |
|---|---|---|---|---|---|
| 3,653,228 | A | * | 4/1972 | Tiberio | F16D 3/80 464/59 |
| 4,721,495 | A | * | 1/1988 | Kan | F16H 7/1236 474/135 |
| 5,186,690 | A | * | 2/1993 | Yamamoto | F16H 7/1236 474/135 |
| 5,328,415 | A | * | 7/1994 | Furutani | F16H 7/1218 474/135 |
| 5,366,417 | A | * | 11/1994 | Shimaya | F16H 7/1272 474/138 |
| 5,924,947 | A | * | 7/1999 | Williams | F16H 7/1236 474/148 |
| 6,165,091 | A | * | 12/2000 | Dinca | F16H 7/1236 474/138 |
| 6,416,435 | B1 | * | 7/2002 | Szatkowski | F16H 7/129 474/135 |
| 6,884,194 | B2 | * | 4/2005 | Meckstroth | F16H 7/1227 474/135 |
| 9,464,698 | B2 | * | 10/2016 | Mennerat | F16H 7/12 |
| 2003/0153419 | A1 | * | 8/2003 | Hodjat | F16H 7/1254 474/94 |
| 2003/0216205 | A1 | * | 11/2003 | Meckstroth | F16H 7/1227 474/135 |
| 2012/0172163 | A1 | * | 7/2012 | Fitz | F16H 55/36 474/94 |
| 2015/0260233 | A1 | * | 9/2015 | Boyes | F16F 15/12333 474/94 |
| 2016/0123453 | A1 | * | 5/2016 | Starodoubov | F16H 7/18 474/94 |
| 2018/0163788 | A1 | * | 6/2018 | Dell | F16H 55/36 |
| 2021/0324937 | A1 | * | 10/2021 | Kieran | F16H 7/20 |

* cited by examiner

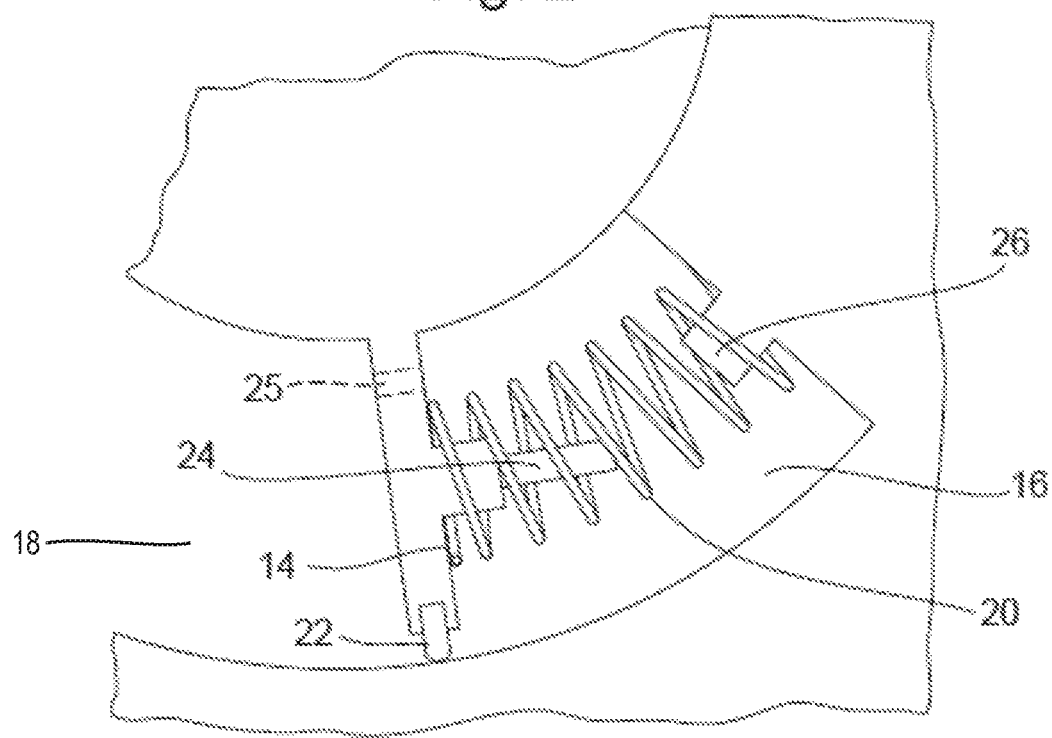
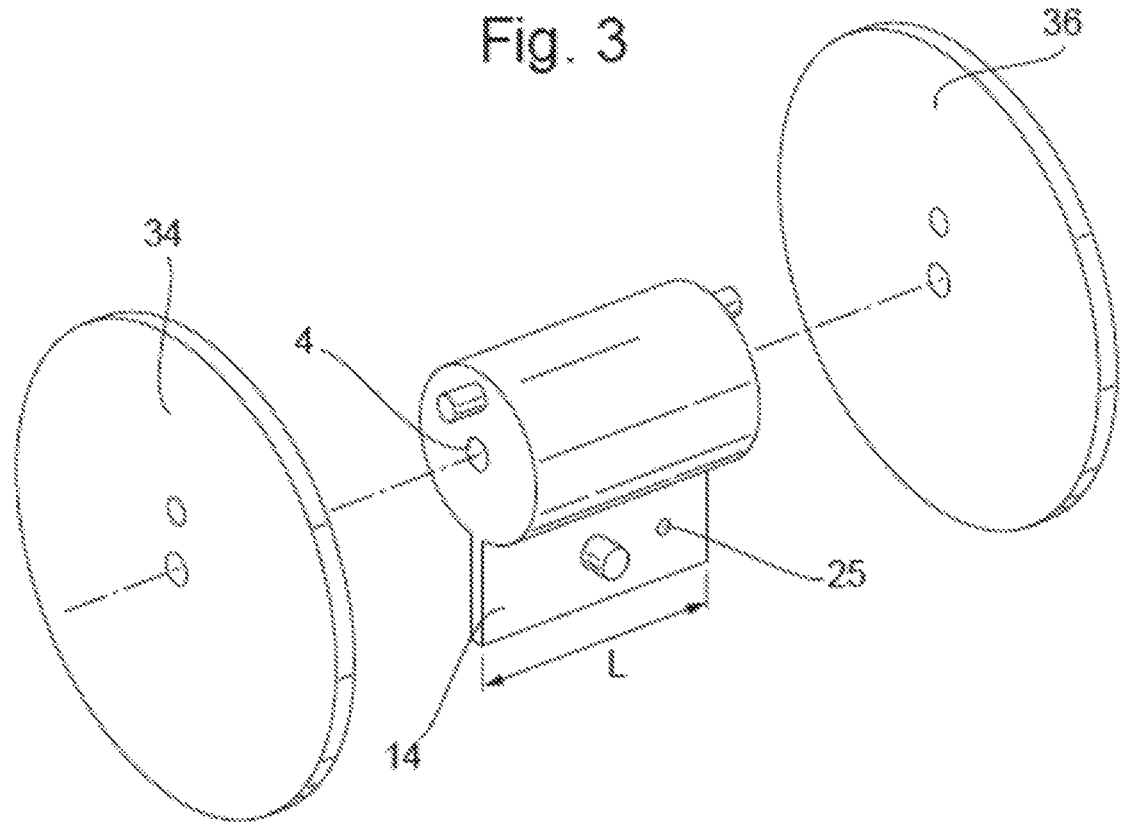

SYSTEM FOR A BELT TENSIONER

CROSS REFERENCE TO RELATED APPLICATIONS

The present application claims priority to United Kingdom Patent Application No. 1909870.6 filed on Jul. 10, 2019. The entire contents of the above-listed application is hereby incorporated by reference for all purposes.

FIELD

The present description relates generally to a belt tensioner for an internal combustion engine.

BACKGROUND/SUMMARY

In some internal combustion engines, the primary drive belt system may experience tension fluctuations due to camshaft and crankshaft torque signatures. A belt tensioner may be used to control the belt tension. This may be carried out using a spring and friction damper system.

However, friction damping is affected by oil quantity and quality, which can make it difficult to maintain the same level of belt tension and variation in belt tension throughout the life of an engine.

There is a need for a tensioning system that functions more consistently through the life of an engine. In one example, the issues described above may be addressed by a belt tensioner for a belt of an engine. The belt tensioner comprises a shaft, an eccentric housing configured to rotate about the shaft, a pulley provided around the housing, a dividing wall extending from the shaft, a fluid chamber defined by the housing, wherein the dividing wall divides the fluid chamber into first and second portions, such that fluid contained therein damps movement of the housing relative to the shaft, and a resilient element coupled to the housing and dividing wall so as to bias the pulley towards the belt. In this way, the belt pulley may comprise a compact configuration while maintaining a desired level of belt tension.

As one example, fluid in the first and second portions may mix via only a first passage arranged in the dividing wall. The volumes of the first and second portions may be adjusted based on a tension of the belt and a force of the resilient member in the fluid chamber. In one example, the resilient member is a spring with a spring force pressing in a direction opposite the force of the belt. By doing this, the first passage and other passages of the fluid chamber along with the resilient member may resist and/or supplement a tension of the belt to maintain a desired belt tension.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows schematic view of a resilient element for the belt tensioner according to an example of the present disclosure;

FIG. 3 shows an exploded schematic view showing parts of the belt tensioner according to an example of the present disclosure.

DETAILED DESCRIPTION

Figure 1:
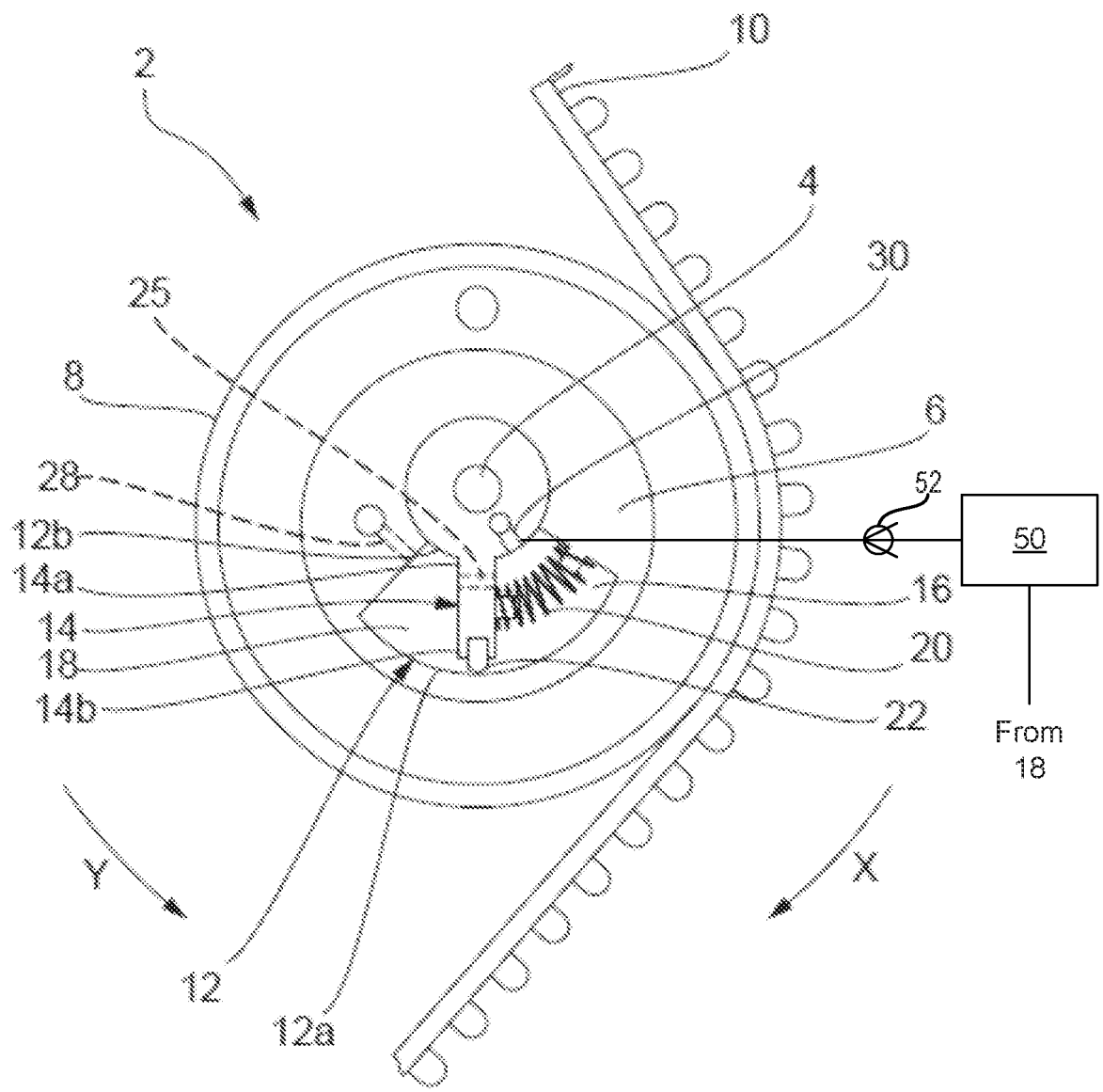
FIG. 1 shows a schematic sectional view of a belt tensioner according to an example of the present disclosure.

The following description relates to a belt tensioner for a belt of an engine, as shown in FIG. 1. The belt tensioner comprises a shaft and an eccentric housing configured to rotate about the shaft. a pulley provided around the housing. A dividing wall extends from the shaft. A fluid chamber is defined by the housing, wherein the dividing wall divides the fluid chamber into first and second portions, such that fluid contained therein dampens movement of the housing relative to the shaft. A resilient element is coupled to the housing and dividing wall so as to bias the pulley towards the belt, as shown in FIG. 2.

The belt tensioner may further comprise a first passage configured to allow fluid to pass between the first and second portions of the fluid chamber. The first passage may be provided in the dividing wall. The first passage may be sized to dampen movement of the housing relative to the shaft.

The belt tensioner may further comprise a second passage configured to permit fluid to flow out of the second portion of the fluid chamber. The second passage may resist the flow of fluid so as to dampen movement of the housing relative to the shaft.

The first passage may dampen movement of the housing in at least a first direction. The second passage may dampen movement of the housing in at least a second direction. The second direction may be opposite the first direction. That is to say, the belt applies a force in the first direction and the spring applies a spring force in the second direction opposite the first direction. The first passage is sized to resist the force of the belt in the first direction and slows a fluid flow rate from the first portion to the second portion. A size of a cross-sectional flow through area of the first passage, and/or the second and third passages, may be adjusted to a desired dimension to achieve a desired belt tension.

The fluid in the fluid chamber may be an oil. The belt tensioner may be fluidly coupleable to a main oil gallery of the engine such that oil is fed into the first portion of the fluid chamber from the main oil gallery. A non-return valve may be provided between the first chamber and the main engine gallery to permit flow from the main oil gallery to the first chamber, but not vice versa.

The resilient element may comprise a spring, e.g. a helical spring. The resilient element may be provided in the first portion of the fluid chamber.

The belt tensioner may further comprise an elastomeric protrusion provided between the dividing wall and a wall of the fluid chamber. The elastomeric protrusion may be configured to limit and slow at least part of the compression of the resilient element. The elastomeric protrusion may be provided inside the spring.

The belt tensioner may further comprise a seal provided between the dividing wall and the housing. The fluid chamber may have an arcuate wall that is centered on a rotational axis of the shaft. The dividing wall may be fixed with respect to the shaft.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

With reference to FIG. 1, there is provided a belt tensioner 2 for a belt 10 of an engine (shown in FIG. 4), such as an internal combustion engine. The engine may provide motive power for a vehicle, such as a motor vehicle (e.g. car, van, truck, motorcycle etc.), industrial or agricultural vehicles (e.g. tractor, forklift, bulldozer, excavator etc.), marine vessel, aircraft or any other type of vehicle. By way of example, the belt 10 may connect a crankshaft of the engine to a camshaft of the engine. Additionally or alternatively, the belt 10 may connect the crankshaft and/or camshaft to one or more accessories of the engine.

The belt tensioner 2 comprises a shaft 4 and an eccentric housing 6 which is configured to rotate about the shaft 4. The shaft 4 may be fixed relative to the engine such that the housing 6 rotates relative to the engine. The belt tensioner housing 6 is eccentric such that rotation of the housing 6 about the shaft 4 varies the tension in the belt 10. The belt tensioner 2 further comprises a pulley 8 which is provided around the housing 6. The pulley 8 is configured to be in contact with the belt 10 and may rotate relative to the housing 6.

A fluid chamber 12 is defined by the housing 6 and has an arcuate wall 12a that is centered on a rotational axis of the shaft 4. The fluid chamber 12 may have an annular sector cross section, the center of radius of the cross section being the rotational axis of the shaft 4. An inner arcuate surface 12b of the fluid chamber 12 may be defined by an outer radial surface of the shaft 4 and the arcuate wall 12a of the fluid chamber 12 may be defined by an inner surface of the housing 6.

A dividing wall 14 extends from the shaft 4. The dividing wall 14 divides the fluid chamber 12 into first and second portions 16, 18. The dividing wall 14 comprises a proximal end 14a which is fixed to the shaft 4 and a distal end 14b which is in sliding contact with the arcuate wall 12a. The dividing wall 14 may be integral with or coupled to the shaft 4. In some arrangements, a seal 22 may be provided between the dividing wall 14 and the arcuate wall 12a. The seal 22 may be provided in a recess in the dividing wall 14. The seal 22 may be fixed to the dividing wall 14 by an interference fit, with an adhesive, or another suitable coupling element. This arrangement may reduce leakage (e.g., fluid transfer) between the first and second portions 16, 18 of the fluid chamber. The seal 22 may also mitigate wear of the distal end 14b of the dividing wall 14 as it slides within the housing. This may be desirable since the seal 22 is smaller and easier to replace than the dividing wall 14.

A resilient element 20, which may comprise a spring, such as a helical spring, is provided in the fluid chamber 12. In particular, the spring 20 is located in the first portion 16 of the fluid chamber 12 and is coupled to the housing 6 and the dividing wall 14 so as to bias the pulley 8 towards the belt 10 (and thereby increase the tension in the belt).

With reference to FIG. 2, an elastomeric, e.g. resilient, protrusion 24 is provided between the dividing wall 14 and a wall of the fluid chamber 12. The elastomeric protrusion 24 is disposed on the dividing wall 14, however, in other arrangements, the elastomeric protrusion 24 is disposed on the housing 6. The elastomeric protrusion 24 may be provided inside the spring 20. In some arrangements, a second protrusion 26 comprising a different material, such as a more rigid material than that of the elastomeric protrusion may be provided between the dividing wall 14 and the housing 6. The second protrusion 26 may be provided on the housing 6 (or on the dividing wall 14 if the elastomeric protrusion is provided on the housing 6). The elastomeric protrusion 24 (e.g., a first protrusion 24) and second protrusion 26 may engage when the spring 20 is partially compressed and may provide an additional restoring force. This arrangement may change the restoring force as the housing 6 rotates relative to the shaft 4.

The belt tensioner 2 further comprises a first passage 25 provided between the first and second fluid chamber portions 16, 18 and permits flow therebetween, albeit at a limited rate. The first passage 25 may be provided in the dividing wall 14 and may comprise a cylindrical channel in the dividing wall 14, for example. The first passage 25 is configured to allow fluid to pass between the first and second portions 16, 18 of the fluid chamber 12.

The belt tensioner 2 further comprises a second passage 28 (shown in FIG. 1) which is provided in a wall of the housing 6 and is in fluid communication with the second fluid chamber portion 18 throughout the range of positions of the housing 6 relative to the dividing wall 14. The second passage 28 may provide a drain passage for oil in the second fluid chamber portion 18 and the second passage 28 may return oil to the engine, e.g. to a sump of the engine. In this way, oil flows to the first chamber portion 16 from the main oil gallery and then to the second chamber portion 18 via the first passage 25. Oil in the first chamber portion 16 may not return to the main oil gallery or flow to the sump. As such, oil in the first chamber portion 16 may flow to only the second chamber portion 18. Oil in the second chamber portion 18 may flow to a sump via the second passage 28, where oil in the sump may be recirculated through the main oil gallery.

With reference to FIG. 3, plates 34, 36 are provided at either end of the shaft 4. The plates 34, 36 are rigidly fixed to the shaft 4. The plates 34, 36 may provide abutment surfaces for limiting axial movement of the housing 6. The dividing wall 14 may be configured to meet the plates 34, 36. However, there may be a clearance between at least one the plates 34, 36 and end surfaces of the housing 6 to allow a certain amount of leakage and thus lubrication between the housing 6 and plates 34, 36. The dimensions, e.g. axial length L, of the shaft may be selected in order to enable a desirable leakage.

Returning to FIG. 1, the first passage 25 may be sized to dampen movement in a first direction X of the housing 6 relative to the shaft 4 and dividing wall 14. The dividing wall 14 may be fixed with respect to the shaft 4. Relative movement between the housing 6 and the dividing wall 14 creates changes in volume between the first and second fluid chamber portions 16, 18. The first passage 25 enables restricted flow of fluid between the first and second portions 16, 18, thereby enabling dampening of the forces applied to the belt tensioner 2.

In some arrangements, there may be a plurality of passages between the first and second fluid chamber portions 16, 18 of the fluid chamber 12. The dimensions of the first passage 25 may be selected to achieve a desirable degree of damping.

The resilient element 20 enables belt tension to be retained when the engine is off and the fluid is not pressurized.

The elastomeric protrusion 24 is configured to limit and slow at least part of the compression of the resilient element 20. The second protrusion 26 may be sized to limit the compression of the spring 20. The elastomeric protrusion 24 may be configured to abut the second protrusion 26 at or towards the maximum compression of the spring 20. The elastomeric material of the elastomeric protrusion 24 may be selected to achieve a desirable damping effect. The length of the elastomeric protrusion 24 is less than the length of the spring 20 when no compressive forces are applied to it by the relative movement of the housing 6 and the dividing wall 14.

The second passage 28 is configured to permit fluid to flow out of the second portion 18 of the fluid chamber 12. The second passage 28 resists the flow of fluid so as to dampen movement of the housing 6 relative to the dividing wall 14. The dimensions of the second passage 28 may be selected to achieve a desirable degree of damping. In one example, a size of the second passage 28 may be increased to decrease dampening or decreased to increased dampening.

Fluid enters the fluid chamber first portion 16 through a third passage 30 which is provided in a portion of the shaft 4 that forms a wall of the first portion 16. In some arrangements, the fluid is oil and the third passage 30 is coupleable to a main oil gallery 50 of the engine. The third passage 30 enables the fluid chamber 12 to be in fluid communication with the main oil gallery 50 such that oil is fed into the first portion 16 of the fluid chamber 12 from the main oil gallery 50 through the third passage 30. A non-return valve 52 may be provided between the first chamber 16 and the main engine gallery 50 to block oil from being pushed back into the main engine gallery 50.

When the tension in the belt 10 is greater than desired, the belt 10 exerts a force on the pulley 8, which transmits this force to the housing 6. Due to the eccentricity of the housing 6, this force causes the housing 6 to rotate about the shaft 4 in order to bring the system towards equilibrium. Since the resultant force does not act through the axis of rotation of the housing 6, a moment is applied to the housing 6. The housing 6 rotates in a first direction X under the applied moment. The relative movement of the housing 6 with respect to the dividing wall 14 causes compression of the spring 20, a decrease in volume of the first portion 16 and an increase in volume of the second portion 18. The change in volume of the first and second portions 16, 18 results in the flow of fluid from the first portion 16 to the second portion 18 through the first passage 25. The restricted flow through the first passage 25 causes a force to be exerted on the housing 6 which opposes the rotation of the housing 6 relative to the dividing wall 14, thereby damping the movement of the housing 6 in the first direction X relative to the dividing wall 14. A tension of the belt may be maintained, in one example.

The rotation of the housing 6 relative to the dividing wall 14 stops when the rotational forces about the center of rotation of the housing 6 are balanced.

When the tension in the belt becomes lower than desired, the force of the belt on the pulley 8 and the housing 6 reduces. When in compression, the spring 20 exerts a restoring force on the housing 6 which opposes all forces from the belt. The restoring force acts at a distance from the rotational axis of the housing 6. This restoring force results in a moment being applied to the housing 6. When this moment exceeds the moment applied to the housing 6 by the belt 10, the housing 6 rotates in a second direction Y to a position which increases the tension in the belt. The relative movement of the housing 6 with respect to the dividing wall 14 causes an increase in volume of the first fluid chamber portion 16 and a decrease in volume of the second portion 18. The change in volume of the first and second portions 16, 18 may result in a flow of fluid from the second portion 18 to the first portion 16 through the first passage 25. Additionally or alternatively, the reduction in the volume of the second fluid chamber portion 18 may cause a flow through the second passage 28. The second passage 28 may be sized to restrict such flow, e.g. by virtue of an orifice. The restricted flow through the first and/or second passages 25, 28 causes a force to be exerted on the housing 6 which opposes the rotation of the housing 6 relative to the dividing wall 14, thereby damping the movement of the housing 6 in the Y direction relative to the dividing wall 14.

The second passage 28 enables fluid to flow out of the second portion 18 of the fluid chamber 12 whilst the second portion 18 is reducing in volume. The restricted flow through the second passage 28 may cause a force to be exerted on the housing 6 by the fluid. This dampens the movement of the housing 6 relative to the dividing wall 14 to maintain a desired tension, in one example.

If no fluid or a small quantity of fluid is present in the fluid chamber 12 and/or the engine is off, the resilient element 20 enables belt tension to be retained.

In some arrangements, the maximum compression of the resilient element 20 and/or dimensions of the elastomeric protrusion 24 and/or second protrusion 26 may be configured to ensure the third passage 30 remains in fluid communication with the first portion 16 throughout the range of positions of the housing 6 relative to the dividing wall 14. This may ensure that the fluid chamber 12 has a supply of fluid throughout use of the belt tensioner 2.

In some arrangements, the second and/or third passages 26, 30 may be provided in the dividing wall 14.

In some arrangements, the resilient element 20 may not be provided in the fluid chamber 12. The resilient element 20 may be a torsional spring which may be provided at an axial end of the shaft 4 and connected to the housing 6.

In some arrangements, there may be a plurality of resilient elements 20 and/or second protrusions 26. The plurality of resilient elements 20 may be distributed along the length of the dividing wall 14 to increase the spread of force on the dividing wall 14 and to reduce torsion in the shaft 4.

In some arrangements, there may be a clearance between the distal end 14b of the dividing wall 14 and the arcuate wall 12a. The housing 6 may rotate relative to the dividing wall 14 such that the clearance is maintained. This clearance enables fluid to flow between the first and second portions 16, 18. The clearance may be provided across the entire length L of the dividing wall 14, or across a portion of the length L. The clearance between the distal end 14b of the dividing wall 14 and the arcuate wall 12 may be provided in addition to, or as an alternative to the first passage 25 and/or the clearance between the shaft and the plates 34, 36.

Figure 4:
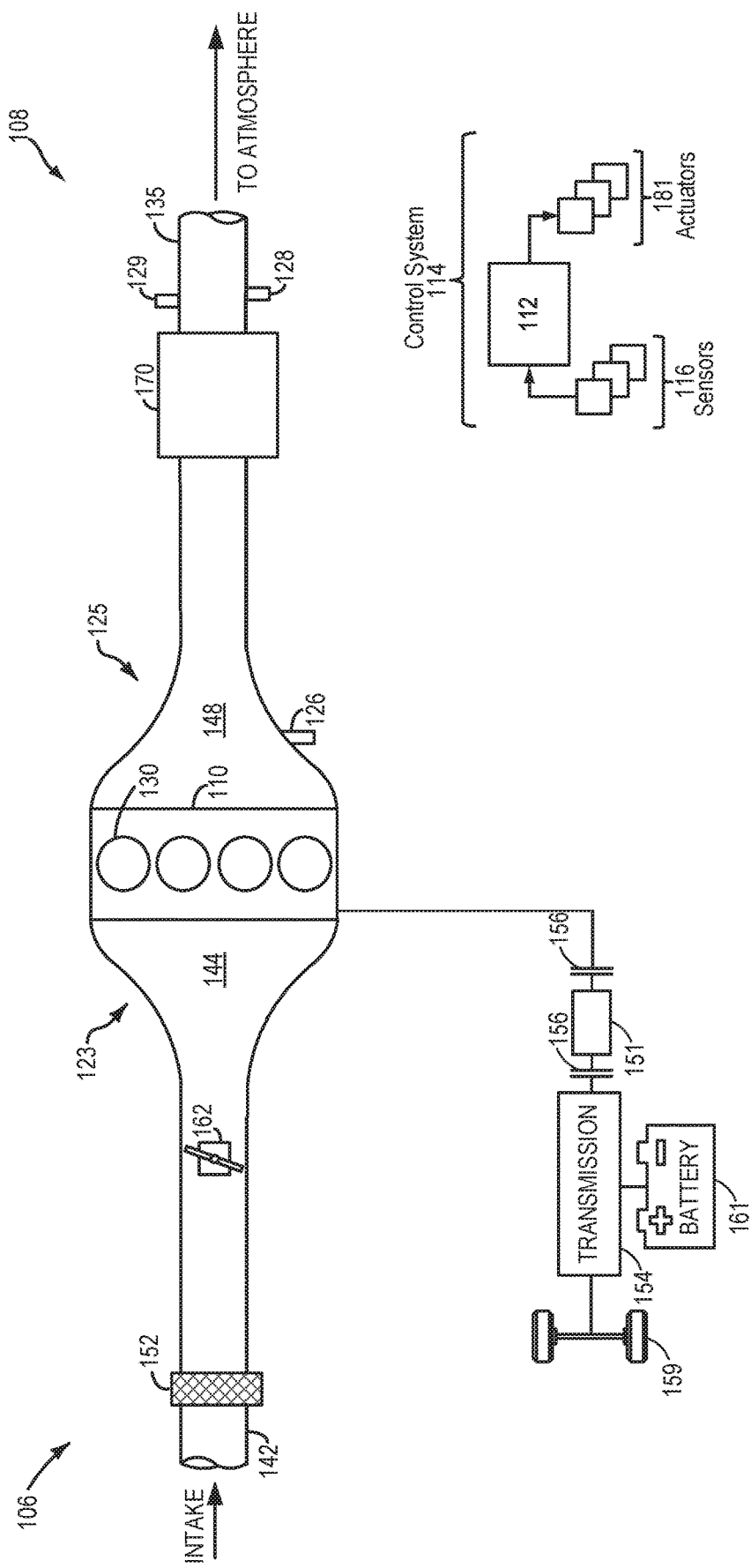
FIG. 4 shows a schematic of an engine of a hybrid vehicle.

FIG. 4 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

It will be appreciated by those skilled in the art that although the disclosure has been described by way of example, with reference to one or more exemplary examples, it is not limited to the disclosed examples and that alternative examples could be constructed without departing from the scope of the disclosure as defined by the appended claims.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a hydraulically assisted and dampened tensioner uses engine oil pressure to provide both a belt tension and system dampening. A mechanical spring is configured to retain belt tension when the engine is off and oil pressure is low. The technical effect of the tensioner is to reduce reliance on an oil pressure while maintaining belt tension via the spring and the other compression components of the tensioner.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A belt tensioner for a belt of an engine, the belt tensioner, comprising:
    a shaft;
    an eccentric housing configured to rotate about the shaft;
    a pulley arranged around the eccentric housing;
    a dividing wall extending from the shaft;
    a fluid chamber defined by the eccentric housing, wherein the dividing wall divides the fluid chamber into a first portion and a second portion, wherein fluid contained in the first portion and the second portion dampens movement of the eccentric housing relative to the shaft;
    a resilient element coupled to the eccentric housing and the dividing wall, wherein the resilient element is configured to bias the pulley towards the belt; and
    a first protrusion arranged within the resilient member and coupled to the dividing wall, and a second protrusion, which comprises a material more rigid than a material of the first protrusion, coupled to the eccentric housing, wherein an engagement between the first protrusion and the second protrusion reduces a speed at which the resilient member is compressed.

2. The belt tensioner of claim 1, wherein the belt tensioner further comprises a first passage configured to allow fluid to flow between the first and second portions of the fluid chamber.

3. The belt tensioner of claim 2, wherein the first passage is arranged in the dividing wall.

4. The belt tensioner of claim 3, wherein the first passage is sized to adjust a dampening provided as the eccentric housing moves relative to the shaft.

5. The belt tensioner of claim 2, wherein the belt tensioner further comprises a second passage configured to permit fluid to flow out of the second portion of the fluid chamber.

6. The belt tensioner of claim 5, wherein the second passage comprises a cross-sectional flow through area sized to resist fluid outflow when the eccentric housing is moving relative to the shaft.

7. The belt tensioner of claim 1, wherein the fluid is oil and the belt tensioner is fluidly coupled to a main oil gallery of the engine, wherein the first portion is fluidly coupled to the main oil gallery.

8. The belt tensioner of claim 7, wherein a non-return valve is arranged between the first portion and the main oil gallery.

9. The belt tensioner of claim 1, wherein the resilient element comprises a spring.

10. The belt tensioner of claim 1, wherein the first protrusion is configured to limit and slow a portion of a compression of the resilient element.

11. The belt tensioner of claim 10, wherein the first protrusion is arranged between the dividing wall and a wall of the fluid chamber.

12. The belt tensioner of claim 1, wherein the belt tensioner further comprises a seal arranged between the dividing wall and the eccentric housing.

13. The belt tensioner of claim 1, wherein the fluid chamber comprises an arcuate wall that is centered on a rotational axis of the shaft.

14. The belt tensioner of claim 1, wherein the dividing wall is fixed with respect to the shaft.

15. The belt tensioner of claim 1, wherein the resilient element is arranged in the first portion of the fluid chamber.

16. A system, comprising:
    a belt tensioner engaged with a belt of an engine, the belt tensioner comprising an eccentric housing configured to rotate about a shaft;
    a pulley arranged around the eccentric housing;
    a dividing wall extending from the shaft into a fluid chamber, wherein the dividing wall divides the fluid chamber into a first portion and a second portion, wherein a first passage fluidly couples the first portion to the second portion, and wherein a second passage fluidly couples the second portion to an oil sump;
    a spring coupled to each of the eccentric housing and the dividing wall;
    a first protrusion arranged within the spring and coupled to the dividing wall, and;
    a second protrusion, which comprises a material more rigid than a material of the first protrusion, coupled to the eccentric housing, wherein an engagement between the first protrusion and the second protrusion reduces a speed at which the spring is compressed.

17. The system of claim 16, further comprising a third passage fluidly coupling a main oil gallery to the first portion.

18. The system of claim 16, wherein the belt applies a force in a first direction and the spring applies a spring force in a second direction opposite the first direction, and wherein the first passage is sized to resist the force of the belt in the first direction and slows a fluid flow rate from the first portion to the second portion.

19. A system, comprising:
    a belt tensioner engaged with a belt of an engine, the belt tensioner comprising an eccentric housing configured to rotate about a shaft;
    a pulley arranged around the eccentric housing;
    a dividing wall extending from the shaft into a fluid chamber, wherein the dividing wall divides the fluid chamber into a first portion and a second portion, wherein a first passage fluidly couples the first portion to the second portion, and wherein a second passage fluidly couples the second portion to an oil sump, and wherein the dividing wall is stationary and the eccentric housing moves relative to the dividing wall;

a spring coupled to each of the eccentric housing and the dividing wall; and a first protrusion is arranged within the spring and coupled to the dividing wall, and wherein a second protrusion, which comprises a material more rigid than a material of the first protrusion, is coupled to the eccentric housing, wherein an engagement between the first protrusion and the second protrusion reduces a speed at which the spring is compressed.

* * * * *